March 13, 1951 — H. A. ALEXANDERSON ET AL — 2,544,973
REGULATOR

Filed Nov. 18, 1944 — 3 Sheets-Sheet 1

Inventors
Howard A. Alexanderson
Henry C. Nette
By Herbert L. Davis, Jr.
Attorney

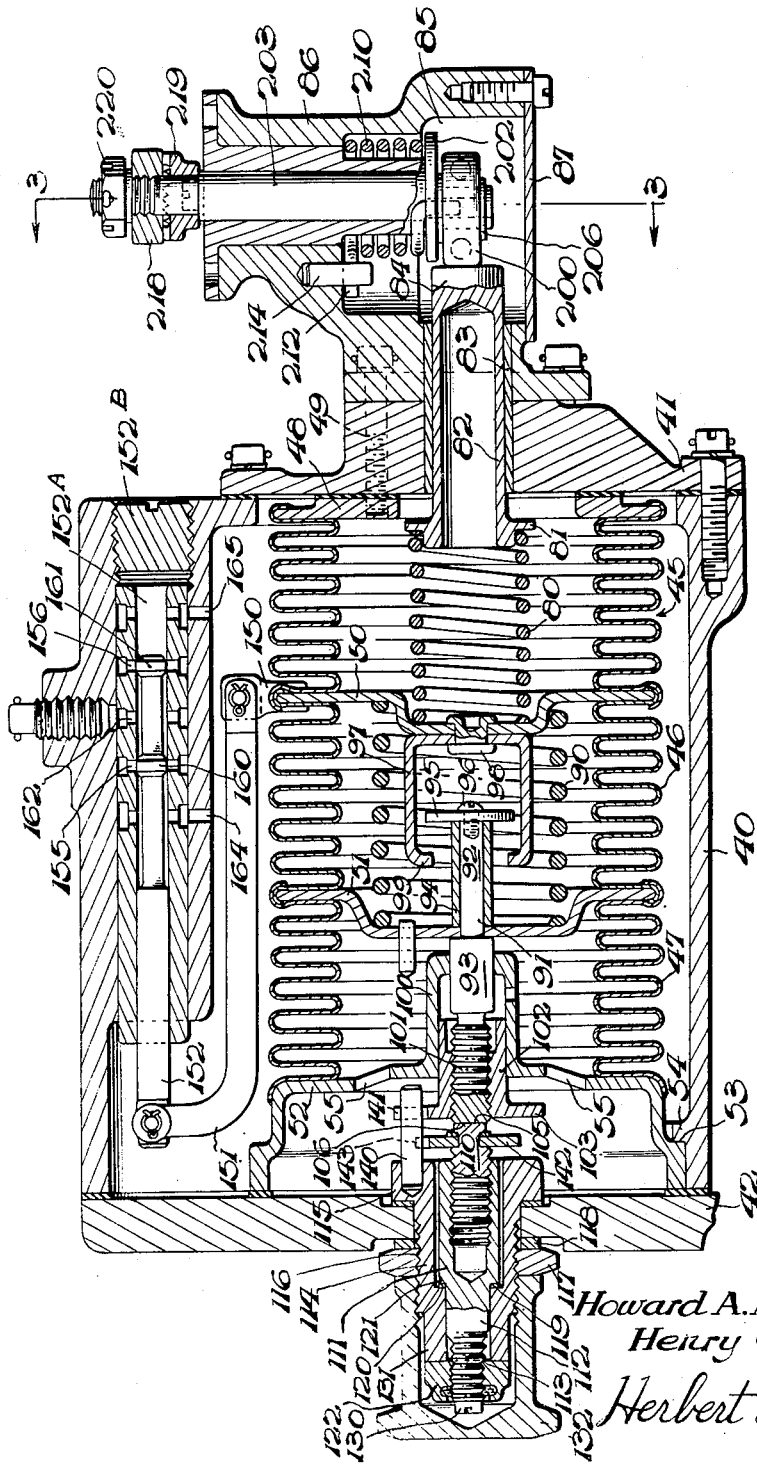

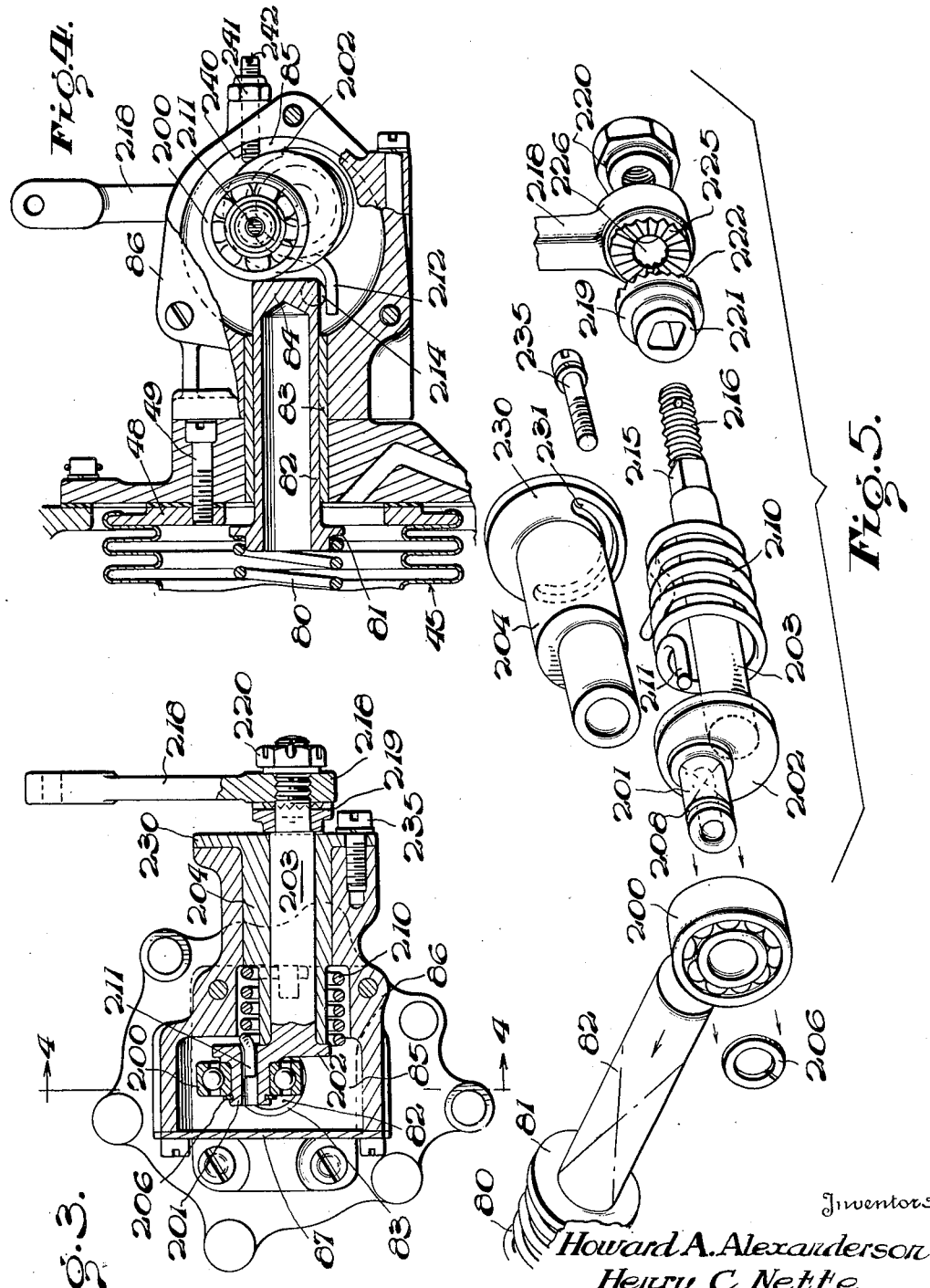

Patented Mar. 13, 1951

2,544,973

UNITED STATES PATENT OFFICE 2,544,973

REGULATOR

Howard A. Alexanderson, Wood-Ridge, and Henry C. Nette, Rutherford, N. J., assignors to Bendix Aviation Corporation, Teterboro, N. J., a corporation of Delaware Application November 18, 1944, Serial No. 564,092

10 Claims. (Cl. 137—153)

The present invention relates to improvements in regulators of the type shown in the copending application Serial No. 551,036, filed August 24, 1944, now Patent No. 2,453,653 patented Nov. 9, 1948, by Howard A. Alexanderson and more particularly to novel means for controlling the air inlet pressure of a supercharged aircraft engine so as to maintain the pressure thereof at selected pressures.

During the operation of so-called "water" or "anti-knock" fluid injection systems for suppressing predetonation in internal combustion engines, an increase in the air inlet pressure of the induction system for the engine is permissible and desirable in order that greater engine power may be obtained than when such injection system is not in operation. Therefore, an object of the present invention is to provide a regulator responsive to operation of such an injection system for effecting a predetermined increase in the air pressure in the induction system during the operation of such a system.

Another object of the invention is to provide a novel regulator arranged to maintain the air inlet of a supercharged aircraft engine at a first preselected pressure value, when such supplemental fluid injection system is not in operation and said regulator further arranged to maintain such pressure at a second relatively higher reset pressure when such injection system is in operation together with novel means for varying such selected pressure values within a predetermined range.

Another object of the invention is to provide novel manually operable means for adjusting the setting of the regulator, including a first spring means for setting the datum of the regulator, and second means for adjusting the tension of said first spring means including a second spring opposing the biasing force of the first spring.

Another object of the invention is to provide second novel means for adjusting the range of the setting of the normal and reset pressure values of the regulator.

A further object of the invention is to provide a novel regulator for a supercharger.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claims for this purpose.

In interpreting the appended claims, where they refer to a supercharger, they are to be construed as including application of the invention to any known type supercharger, however driven, and to any type of throttle controlled engine, and, where the claims are directed to less than all of the elements disclosed, they are intended to cover possible uses of the recited elements in installations which lack the non-recited elements.

In the drawings, wherein reference numerals refer to like parts throughout the several views:

Figure 2 is an enlarged sectional view taken along the lines 2—2 of Figure 1 and looking in the direction of the arrows.

Figure 3 is a sectional view of the operating lever of Figure 2 taken along the lines 3—3 of Figure 2.

Figure 4 is an enlarged interior view of the regulator adjusting mechanism of Figure 1 with the side plate broken away.

Figure 5 is an exploded perspective view of the improved regulator adjusting mechanism.

Figure 1:
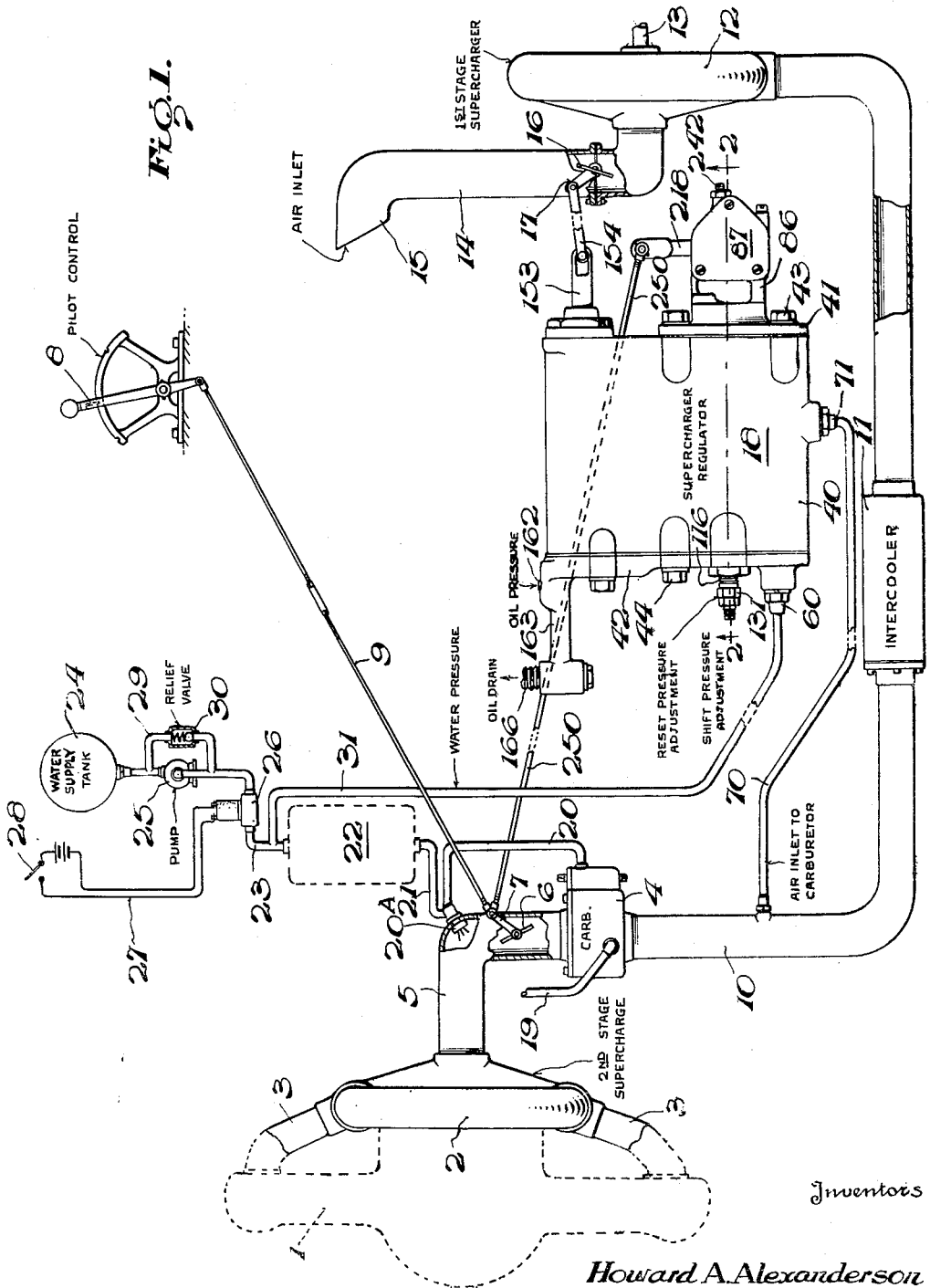
Figure 1 is a schematic view illustrating the manner in which the regulator may be connected in operating relation in the induction and supplemental fluid injection system for an aircraft engine.

Referring first to Figure 1, there is shown in dotted outline a typical radial aircraft engine 1 drivingly connected in a conventional manner to a supercharger 2. The supercharger 2 has provided conduits 3 discharging into the cylinder intakes of the engine 1. The engine 1 is also provided with a carburetor indicated generally by numeral 4 operably connected by means of conduit 5 to the inlet of the supercharger 2. A conventional butterfly valve 6 is provided in the conduit 5. The valve 6 has the usual operating lever 7 positioned by a pilot's control lever 8 through connecting rod 9. A conduit 10 connects through an intercooler 11 the air inlet of the carburetor 4 to the outlet of a primary stage supercharger 12. The supercharger 12 may be drivingly connected through a shaft 13 to the aircraft engine 1 or to any other suitable driving means. A conduit 14 connects the inlet of the supercharger 12 to the atmosphere through a suitable air inlet member 15.

A conventional butterfly valve 16 having an operating lever 17 is provided in the air inlet 14 for the supercharger 12. The lever 17 is operatively controlled by a regulator 18, as will be hereinafter explained.

As best shown schematically in Figure 1, there is connected to the carburetor 4 a conduit 19 leading from a suitable source of fluid fuel for the aircraft engine. There is also provided a conduit 20 for injecting the fuel into the induction system through a nozzle 20A. There is further provided a conduit 21 for injecting into the induction system through nozzle 20A a supplemental or so-salled "anti-knock" fluid medium such as water, water-alcohol or other suitable fluid well known in the art for suppressing predetonation of the engine 1.

The conduit 21 is connected to a suitable metering device shown in dotted outline and indicated generally by the numeral 22. The latter metering device may be of any suitable type known in the art for determining the rate of flow of the "supplemental" fluid, and, since the herein invention resides in the regulator means rather than in the metering device, the same has been shown diagrammatically by the outline indicated by numeral 22.

A conduit 23 leads to the metering device 22 from a suitable source of "supplemental" fluid indicated by numeral 24. In the conduit 23, there is provided a pump indicated by numeral 25 driven by a suitable power means not shown. The pump 25 supplies the fluid medium under pressure to the metering device 22. A valve 26 is provided in the conduit 23 between the pump and metering device 22 for "off" and "on" control of the "supplemental" fluid injection system. The control valve 26 may be of any suitable type, but is shown herein as of an electromagnet controlled type having an electrical control circuit 27 and switch 28 which is preferably mounted within the aircraft cabin for convenient operation by the pilot. Thus the supplemental fluid injection system may be placed in operation by the pilot closing the switch 28 so as to effect the opening of the valve 26. Conversely, the valve 26 may be closed by opening the switch 28. A by-pass conduit 29 and relief valve 30 is provided for recirculating the fluid medium from the pump outlet to the pump inlet at such times as the valve 26 is closed and the injection system is not in operation.

A conduit 31 is connected to the conduit 23 between the valve 26 and the metering device 22. The conduit 31 leads to the regulator 18, so that during operation of the injection system, the regulator 18 is subject to the pressure of the supplemental fluid medium under force of the pump 25, as will be explained hereinafter. It will be readily seen, however, that, when the injection system is in operation, the fluid medium will exert through the conduit 31 a greater pressure under force of the pump 25 than when the injection system is not in operation.

The regulator 18, as best shown in Figures 1 and 2, includes a casing or housing 40 having end plates 41 and 42 fastened at opposite ends of the casing 40 by bolts 43 and 44, respectively.

Positioned within the casing 40 and between the end plates 41 and 42 are three flexible walled cylinders or bellows 45, 46, and 47. The bellows 45 is fastened at one end to a plate 48 connected to the end plate 41 by bolts 49. The opposite end of the bellows 45 is fastened about the adjacent ends of bellows 46 and a sealing plate 50 interposed between the opposite ends of the bellows 45 and 46.

A second sealing plate 51 is positioned at the other end of the bellows 46 and has the adjacent ends of bellows 46 and 47 secured about the periphery thereof.

The opposite ends of bellows 47 are secured to the sides of a rigid cup-shaped member 52 having a flanged portion 53 which engages a raised portion 54 projecting from the inner surface of the casing 40. The open end of the cup-shaped member 52 is closed in sealing relation by the end plate 42. Ports 55 open from the interior of the member 52 into the interior of the bellows 47.

The conduit 31, as best shown in Figure 1, connected at one end to the supplemental fluid supply conduit 23, is connected at the opposite end to a nipple 60 mounted in the end plate 42 and opening through a suitable passage, not shown, into the interior of the cup-shaped member 52.

A second conduit 70 leads from the carburetor air inlet conduit 10 to a nipple 71 mounted in the side of casing 40. The nipple 71 opens into a suitable passage formed in the wall of the casing 40 and leading into a passage formed in end plate 41, and the latter passage opens into the interior of bellows 45.

A helical spring 80 is positioned within the bellows 45 and has one end biased against the plate 50, while the opposite end of the spring 80 is held by a plate 81 affixed to a longitudinally adjustable rod 82. The rod 82 is slidably mounted in a sleeve 83 mounted in the end plate 41 and has an end portion 84 projecting through the plate 41 into a chamber 85 provided in a casting 86. The latter casting is formed integral with the end plate 41. A suitable cap member 87 closes the chamber 85 and suitable mechanism is provided for slidably adjusting the rod 82 as will be explained hereinafter. It will be readily seen, however, that, by slidably adjusting the rod 82 in the end plate 41, the relative position of the plate 81 may be adjusted longitudinally so as to vary the tension exerted by the spring 80.

As shown in Figure 2 the bellows 46 is evacuated and has provided therein a second spring 90 interposed between the end plates 50 and 51 and tending to bias the plate 50 so as to oppose the biasing force exerted on the plate 50 by the spring 80.

The plate 51 has provided a novel support including a stem member 91 affixed to the plate 51 and having portions 92 and 93 projecting at opposite sides thereof into the bellows 46 and 47 respectively.

The portion 93 engages one side of the plate 51, while a tubular member 94 surrounds the portion 92 and is drawn into engaging relation with the other side of the plate 51 by a disk 95 fastened at the free end of the portion 92 by a screw 96. The disk 95 is arranged to move freely within a strap 97 fastened at one end by a rivet member 98 to the plate 50. The strap 97 has a flanged portion 99 provided at the other end arranged to engage the disk 95 at the extreme limit of movement of the plate 50 under the biasing force of the spring 90. Similarly, the screw 96 will engage the rivet member 98 to limit the movement of the plate 50 in the opposite direction under the biasing force of the spring 80 augmented by the biasing force of the pressure medium introduced into the bellows 45 through the conduit 70. Thus, the expansion and contraction of the bellows 45 and 46 may be limited within a safe range, so as to prevent under extreme pressure conditions the overtravel of a control valve 152 operably connected thereto.

The portion 93 of the stem 92 slides within a collar 100 projecting into the bellows 47 from the cup-shaped member 52. A screw threaded end 101 projects from the portion 93 and has screw threadedly engaged thereon a nut portion 102 having a flange 103 mounted at one end thereof. The opposite end of the nut portion 102 is suitably recessed so as to receive part of the portion 93 upon longitudinal adjustment of the nut 102 in relation thereto. The flange 103 of the nut 102 is arranged to engage the inner surface of the member 52 so as to limit the movement of the plate 51 upon expansion of the bellows 47 under the biasing force of a pressure medium therein, as will be explained.

Movement of the plate 51 in an opposite direction as upon contracting of the bellows 47 is limited by the free end 105 of the portion 101 contacting an adjacent end 106 of an adjustable stem 110.

The adjustable stem 110 is screw threadedly engaged in a sleeve portion 111 of a stem 112 having a screw threaded end portion 113. The stem 112 and sleeve portion 111 are rotatably mounted in a sleeve 114 which projects through the end plate 42. The sleeve 114 has provided at the inner end thereof a flange portion 115 which engages the inner surface of the end plate 42. Suitable screw threads 116 are provided on the outer surface of the sleeve 114 for engagement by a suitable nut 117 which fastens the sleeve 114 in the end plate 42 at the outer side thereof. A suitable sealing member 118 is positioned between the end plate 42 and the flange 115 for preventing leakage of a fluid medium.

Provided within the sleeve 114 is a shoulder 120 arranged to cooperate with shoulder 121 provided on stem 112 to prevent outward longitudinal movement of the stem 112 in relation to the sleeve 114. A suitable sealing member 119 is positioned between the shoulders 120 and 121. A nut 122 is positioned at the outer end of the stem 112 in screw threaded engagement with the portion 113 and in contacting relation with the outer end of the sleeve 114 so as to prevent inward longitudinal movement of the stem 112 in relation to the sleeve 114. A cleft portion 130 is provided at the end of the stem 112 while a hexagonal shaped portion 131 is provided on the sleeve 114, as best shown in Figures 1 and 2, for facilitating rotary adjustment of the stem 112 and sleeve 114, as will be explained. A cover cap 132 is provided to prevent accidental adjustment of the sleeve 114 and stem 112 and may be screw threadedly mounted on the threads 116.

A pin 140 is fixedly mounted in the flange 115 at the inner end of the sleeve 114 and extends longitudinally into a suitable slot 141 formed in the flange 103 of the nut 102 so that the nut 102 may be rotatably connected to the sleeve 114. Further, a plate 142 is fixedly mounted at the free end of the adjustable stem 110. The plate 142 has provided a suitable notch 143 in which is engaged the pin 140 so as to prevent relative rotary movement between the stem 110 and sleeve 114.

From the foregoing, it will be readily seen that, by rotating the stem 112 relative to the sleeve 114 through means of a screw driver or other suitable tool operably engaged in the cleft 130, the stem 110 screw threadedly engaged in the sleeve 111 will move longitudinally since the same will be secured against rotary movement by the pin 140 carried by the sleeve 114 which may be held against rotary movement in any convenient manner. Thus, the position of the end 106 of the stem 110 may be adjusted in relation to the end 105 of the stem 101 and accordingly the return or initial position of the plate 51, as shown in Figure 2, may be varied. Thus the range of pressure settings under normal operation through adjustment of the rod 82 may be varied.

Moreover, upon imparting a rotary movement to the sleeve 114 in relation to the end plate 42 through means of a wrench or other suitable means operably engaging the hexagonal portion 131, it will be seen that a corresponding rotary movement will be imparted through the pin 140 to the nut 102 through the flange 103 and connecting slot 141. Such rotary movement will cause the nut 102 to move longitudinally on the screw threaded portion 101 of the stem 93, since the stem 93 is fixedly mounted on the plate 51 against a rotary movement relative thereto. Such longitudinal movement of the nut 102 will vary the position of the flange 103 in relation to the inner surface of the cup-shaped member 52 and thereby provide means for adjusting the second or reset position of the plate 51 and accordingly, through adjustment of the spring 90, the reset pressure setting of the plate 50 for a given position of the rod 82. Through adjustment of sleeve 114, the range of pressure settings under water injection operating conditions may be varied.

As shown in Figure 2, there is operably connected to the plate 50 an arm 150 which extends in rigid fashion exteriorly from the same. A link 151 connects the arm 150 to a control valve 152 slidably mounted in a valve cylinder 152A closed by a suitable plug 152B.

There is provided in the casing 40 a servo piston 153 slidably positioned in a cylinder not shown, having two ports 155 and 156 on opposite sides of said piston, through which ports fluid is caused to flow whenever corresponding spaced covering portions 160 and 161, respectively, of the control valve 152 are not in flow inhibiting relation thereto.

The operating fluid may be oil received from the engine oil supply by way of port 162 formed in a mounting pad 163 as shown in Figure 1.

The oil may be returned from the piston cylinder by way of port 164 or 165 leading into the interior of the casing 40 from the valve cylinder 152A, as the case may be, whenever a shifting of the control valve 152 from its neutral position causes one of said ports 164 or 165 to receive oil discharged from the piston cylinder. A port 166 formed in the mounting pad 163 carries the discharged oil from the interior of the casing 40 to a return conduit leading to the engine oil sump.

As best shown in Figure 1, a piston 153 is operably connected at its free end by a link 154 to the operating lever 17 of the valve 16 for controlling the air inlet to the supercharger 12.

Referring now to the novel adjustable rod 82 the mechanism for adjusting the same includes, as shown in Figures 2, 3, 4, and 5, an anti-friction roller bearing 200 rotatably mounted by suitable ball bearings on a tubular member 201 projecting from an arm 202 fastened to a shaft 203. The member 201 is positioned in eccentric relation to the shaft 203 which is rotatably mounted in an eccentric sleeve 204 positioned in the casting 86 at right angles to the slidable rod 82.

The anti-friction roller bearing 200 is rotatably mounted on the tubular member 201 and held in position thereon by a split ring 206 engaged in a suitable annular groove 208 formed in an end of the tubular member 201.

The roller bearing 200 is biased into contacting relation with the free end 84 of the rod 82 by a helical spring 210 surrounding a portion of the sleeve 204 and having one end 211 positioned in the tubular member 201, while the opposite end 212 of the helical spring 210 bears upon a pin 214 mounted in the casting 86 and projecting into the chamber 85. Thus as viewed in Figure 2, the spring 210 tends to bias the anti-friction roller bearing 200 in a counterclockwise direction about one end of the shaft 203 and into contacting relation with the end 84 of the rod 82. The spring 210 thus opposes the biasing force of the spring 80.

The opposite end of the shaft 203 projects from the casting 86 and has provided at the latter end thereof a squared portion 215 and a screw threaded portion 216.

An arm 218 is fastened to the shaft by means of securing members 219 and 220. The member 219 has a squared opening 221 corresponding to the squared portion 215 and may be locked thereon. The member 219 has suitable serration 222 arranged to engage corresponding serrations 225 surrounding an opening 226 formed in the free end of the arm 218. The screw threaded portion 216 of the shaft projects through the opening 221 and 226 and the serrations 222 and 225 are locked in engaging relation through means of the nut 220 screw threadedly engaged on the screw threaded portion 216 at the opposite side of the arm 218 from the serrations 225.

It will thus be seen that movement of the arm 218 will impart a corresponding movement to the shaft 203 so as to cause the anti-friction roller bearing 200 to adjust through rod 82 to the spring 80. Movement of the arm 218 in a direction for increasing the biasing force exerted by the spring 80 will be augmented by the biasing force exerted by the spring 210 and thus adjustment may be effected with a minimum force.

The eccentric sleeve 204 mounted within the casting 86 has provided a flanged portion 230 in which is formed an arcuate slot 231. There is provided in the arcuate slot 231 a fastening screw 235 screw threadedly engaged in the casting 86. In order to effect the proper adjustment of the shaft 203 and thus the roller 200 in relation to the rod 82, the flange 230 may be rotated relative to the casting 86 and fastened in a desired position by means of the screw 235.

As shown in Figure 2, there projects into the chamber 85, a limit screw 240 which is screw threadedly engaged in the casting 86 and is locked in position by a lock nut 241. The screw 240 has a cleft portion 242 provided at the outer end thereof for the ready adjustment of the screw 240.

The free end of the arm 218 is operably connected by a rod 250 to the arm 7 of the throttle valve 6 and operably connected by a rod 9 to the pilot's control lever 8. Through the latter arrangement it will be readily seen that as the throttle valve 6 is moved in a closing direction the arm 218 will be moved in a counterclockwise direction, which as shown in Figure 4, will cause movement of the anti-friction roller bearing 200 in a direction for increasing the tension of the spring 80 and thereby decrease the setting or datum of the bellows 45 and accordingly the value of the pressure required to hold the valve 152 in a neutral position.

Thus as the throttle valve 6 is opened, an increase in the datum of the boost and the pressure provided by the supercharger 12 will result while a decrease in the opening of the throttle 5 will effect an opposite result. Through this novel arrangement surging between the first and second stage superchargers may be effectively eliminated.

In the adjustment of the regulator 18 for operation, the stem 112 is first adjusted so as to position the stem 93 and plate 51 in relation to the spring 90 in such a manner that a shifting of the plate 51 to a second or reset position will be effected by the supplemental fluid carried by conduit 31 at a pressure indicative of operation of the supplemental fluid injection system and the range of pressure adjustment readily determined for normal operation.

Second, the sleeve 114 may then be adjusted so as to position the flange 103 of the nut 102 in a manner so as to limit the adjustment of the plate 51 during the operation of the supplemental fluid injection system to a position which will effect a predetermined high pressure setting range for the induction system. Thus, in the latter reset position, through the resulting adjustment of the spring 90, the bellows 45 and 46 forming a pressure boost control will cause the plate 50 to assume a neutral position in relation to the control valve 152 when the carburetor air inlet pressure acting within the bellows 45 is at the predetermined increased pressure value set by adjustment of the lever 218 during operation of the supplemental fluid injection system.

In the operation of the regulator 18, it will be seen that, during normal operation, an increase in the pressure at the air inlet to the carburetor above the value set by the position of the lever 218 will cause the bellows 45 to shift the plate 50 to the left, shifting the control valve 152 and actuating the servo piston 153 of Figure 1 to the right, tending to close the valve 16 to the supercharger inlet and thereby decreasing the pressure in the carburetor air inlet 10 until the valve 151 is returned to a neutral position. A decrease in the carburetor inlet pressure below such set value will effect an opposite adjustment of the valve 16 and increase the pressure at the carburetor air inlet. Thus, while the altitude of the aircraft or other operating conditions of the aircraft may vary effecting the induction pressure, the regulator 18 will tend to readjust the valve 16 so as to maintain such pressure at a substantially constant value.

Upon initiating the operation of the supplemental fluid injection system by opening the valve 26, a fluid medium will be supplied the conduit 23 under pressure of the pump 25, whereupon the fluid pressure supplied the regulator 18 through the conduit 31 will be increased, effecting an expansion of the bellows 47 and the shifting of the plate 51 from the position shown in Figure 2 to a second position to the right, as determined by the adjustment of the flange 103, and thereby changing the datum or setting of the boost control, bellows 45 and 46. Thus, such an adjustment of the plate 51 will cause a corresponding adjustment through the spring 90 of the plate 50 and valve 152, causing the piston 153 to be adjusted to left and opening the valve 16 until the pressure within the carburetor air inlet conduit 10 has been increased to such a value as to bias the plate 50 to the left so as to return the valve 151 to a neutral position. The bellows 45 and 46 will then tend to maintain the pressure at the latter reset value. The said increased boost pressure will permit greater engine power to be obtained during operation of the supplemental fluid injection system than would be otherwise possible.

However, upon the operation of the supplemental fluid injection system being discontinued, the pressure supplied the bellows 47 through the conduit 31 will be decreased, whereupon the spring 90 will return the plate 51 to the position, shown in the Figure 2, and the pressure setting or datum of the boost control 45 and 46 will once again resume the normal value for the first position.

It will be noted moreover that through operation of the lever 218 interconnected to the throttle control lever 8, the pressure setting of the boost control may be readily varied during normal operation and during the operation of the supplemental fluid injection system within ranges determined by the adjustment of the stem 112 and sleeve 114 respectively. Moreover in view of the interconnection between the throttle valve 6 and the lever 218 an increase in the setting of the boost will be jointly effected with the opening of the throttle valve 6, while a decrease in the setting of the boost will be jointly effected with the closing of the throttle valve 6 so as to avoid objectionable surging in the air flow between the first and second stage superchargers.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. A regulator for an engine of an aircraft comprising, in combination, a first member responsive to a first condition, a second member responsive to a second condition, spring biasing means interposed between said first and second members for biasing said members in opposite directions, control means operated by said first member in response to said first condition, said second member adjusting the biasing force of said spring means in response to said second condition for varying the datum of said first member, and other means for adjusting the datum of said first member, said other means including second spring means for counteracting the biasing force of said first mentioned spring means, roller bearing means adjustably positioned for varying the force exerted by said second spring means and means to connect said roller bearing means for operation from a cabin of the aircraft.

2. A regulator comprising, in combination, a first bellows responsive to a first condition, a second bellows responsive to a second condition, spring biasing means interposed between said first and second bellows for biasing said bellows in opposite directions, control means operated by said first bellows in response to said first condition, said second bellows adjusting the biasing force of said spring means in response to said second condition for varying the datum of said first bellows, and other means for adjusting the datum of said first bellows, said other means including spring means for counteracting the biasing force of said first mentioned spring means, roller bearing means adjustably positioned for varying the force exerted by said last mentioned spring means, and a third spring means acting upon said roller bearing means in a direction opposing the biasing force of said last mentioned spring means.

3. A regulator for an engine of an aircraft, comprising, in combination, a first bellows responsive to a first condition, a second bellows responsive to a second condition, spring biasing means interposed between said first and second bellows for biasing said bellows in opposite directions, control means operated by said first bellows in response to said first condition, said second bellows adjusting the biasing force of said spring means in response to said second condition for varying the datum of said first bellows, other means for adjusting the datum of said first bellows, said other means including spring means for counteracting the biasing force of said first mentioned spring means, roller bearing means adjustably positioned for varying the force exerted by said last mentioned spring means, means to connect said roller bearing means for operation from a cabin of the aircraft, and means for adjusting the operating range of said datum changing means.

4. A regulator comprising, in combination, a first bellows responsive to a first condition, a second bellows responsive to a second condition, spring biasing means interposed between said first and second bellows for biasing said bellows in opposite directions, control means operated by said first bellows in response to said first condition, said second bellows adjusting the biasing force of said spring means in response to said second condition for varying the datum of said first bellows, and other means for adjusting the datum of said first bellows, said other means including spring means for counteracting the biasing force of said first mentioned spring means, roller bearing means adjustably positioned for varying the force exerted by said last mentioned spring means, means to connect said roller bearing means for operation from a cabin of the aircraft, first means for adjusting the operating range of said other datum changing means and effective during inoperation of said second bellows, and second means for adjusting the operating range of said other datum changing means and effective upon operation of said second bellows in response to said second condition.

5. A regulator comprising, in combination, a first member responsive to a first condition, a second member responsive to a second condition, spring biasing means interposed between said first and second members for biasing said members in opposite directions, control means operated by said first member in response to said first condition, said second member adjusting the biasing force of said spring means in response to said second condition for varying the datum of said first member, manually operable means for changing the datum of said first member during operation and inoperation of said second member, and means for adjusting the operating range of said datum changing means during the operation and inoperation of said second member.

6. Means for adjusting biasing force of a spring element, comprising, in combination, a casting providing a housing for said means, a longitudinally adjustable rod slidably mounted in said casting and bearing at one end upon said spring element for adjusting the biasing force thereof, a shaft rotatably supported in said casting, said shaft having one end positioned within the casting and another outer end projecting from said casting, a member projecting from the one end of said shaft and positioned in eccentric relation to said shaft, an annular shaped roller member rotatably mounted on said projecting member and contacting at its peripheral edge another end of said rod, spring means biasing said projecting member and thereby said roller member in a direction opposing the biasing force of said spring element, and manually operable means connected at the outer end of the shaft for adjustably positioning said roller member about the axis of rotation of said shaft for the adjustment of said spring element.

7. Means for adjusting biasing force of a spring element, comprising, in combination, a casting providing a housing for said means, a longitudinally adjustable rod slidably mounted in said casting and supporting at one end said spring element, a shaft rotatably supported in said casting, said shaft having one end positioned within the casting and another outer end projecting from said casting, a tubular member projecting from the one end of said shaft and positioned in eccentric relation to said shaft, an annular shaped roller member, ball bearings rotatably mounting said member on said projecting member, said roller member contacting at its peripheral edge another end of said rod, a helical spring positioned about said shaft, one end of said spring secured by said casting and an opposite end of said spring positioned in said projecting tubular member so as to bias the projecting tubular member about the axis of rotation of said shaft and said annular roller member in a direction opposing the biasing force of said spring element, and a control arm affixed to the outer end of the shaft for rotation of said shaft so as to effect adjustment of the biasing force of the spring element.

8. For use in a pressure regulator including a fluid pressure responsive member, and adjustable spring means for varying the datum of said pressure responsive member; the combination comprising a longitudinally adjustable rod adapted to be operably connected at one end to said spring means, a roller member operably contacting the other end of said rod, a shaft, a member projecting from one end of said shaft and positioned in eccentric relation to said shaft, ball bearings rotatably mounting said roller member concentrically on said projecting member, a second spring means positioned about said shaft and biasing said roller member in a direction opposing the biasing force of said first mentioned spring means, manually operable means for adjustably positioning said roller member about the axis of rotation of said shaft for adjusting said first mentioned spring means.

9. For use in a pressure regulator including a fluid pressure responsive member, and an adjustable spring for varying the datum of said pressure responsive member; the combination comprising a roller member, means adapted to operably connect said roller member to said pressure responsive member through said spring, a shaft, a member projecting from one end of said shaft and positioned in eccentric relation to said shaft, said roller member rotatably mounted on said projecting member and adjustably positioned about the axis of rotation of said shaft for adjusting the spring and thereby the datum of said pressure responsive member, another spring biasing said roller member in a direction opposing the biasing force of said first mentioned spring, and manually operable means for adjustably positioning said shaft and thereby the roller member relative to said first mentioned spring.

10. For use in a pressure regulator including a fluid pressure responsive member, and an adjustable spring for varying the datum of said pressure responsive member; the combination comprising a roller member, means adapted to operably connect said roller member to said pressure responsive member through said spring, a shaft, a tubular member projecting from one end of said shaft and positioned in eccentric relation to said shaft, a helical spring positioned about said shaft, one end of said helical spring fixedly mounted and the opposite end of said helical spring positioned in said tubular member so as to bias said roller member in a direction opposing the biasing force of said first mentioned spring, said roller member rotatably mounted on said tubular member and adjustably positioned about the axis of rotation of said shaft under the biasing force of said helical spring to adjust the datum of said pressure responsive member.

HOWARD A. ALEXANDERSON.
HENRY C. NETTE.

REFERENCES CITED

The following references are of record in the file of this patent:

UNITED STATES PATENTS

| Number | Name | Date |
|---|---|---|
| 1,324,083 | Tolmin | Dec. 9, 1919 |
| 1,579,536 | Hodgson | Apr. 6, 1926 |
| 1,841,337 | Roessler | Jan. 12, 1932 |
| 2,098,914 | Gorrie | Nov. 9, 1937 |
| 2,282,529 | Pierce | May 12, 1942 |
| 2,323,204 | Cross | June 29, 1943 |

FOREIGN PATENTS

| Number | Country | Date |
|---|---|---|
| 475,389 | Great Britain | Nov. 18, 1937 |